United States Patent Office 3,666,405
Patented May 30, 1972

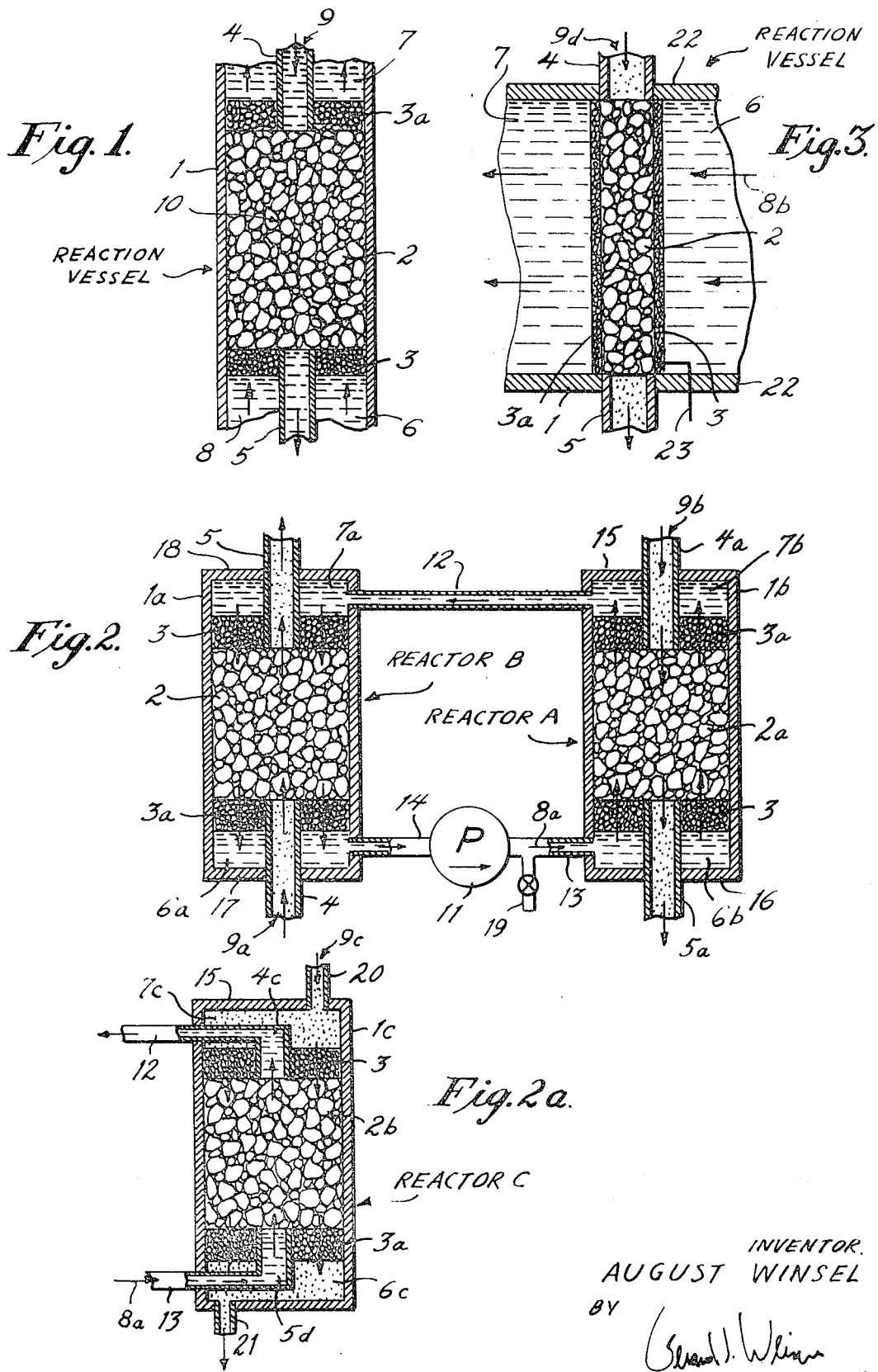

3,666,405
METHOD OF REMOVING CARBON DIOXIDE
FROM GASEOUS MIXTURES
August Winsel, Kelkheim, Germany, assignor to Siemens Aktiengesellschaft, Berlin and Munich, and Varta Aktiengesellschaft, Frankfurt am Main, Germany
Filed Apr. 11, 1967, Ser. No. 630,128
Claims priority, application Germany, Apr. 16, 1966, S 103,215
Int. Cl. B01d 53/34; H01d 27/00
U.S. Cl. 23—2 R
9 Claims

ABSTRACT OF THE DISCLOSURE

Heterogeneous chemical or electrochemical reaction between substances contained in or forming at least two separate fluid phases, or the transfer of one or more substances from one fluid phase to another fluid phase, is effected by contacting the fluid phases with each other while they are contained as separate phases and under different hydrostatic pressures, in the pores of porous structure in a novel apparatus.

BACKGROUND OF THE INVENTION

Field of the invention

This invention relates to several new processes involving the physical and/or chemical interaction between two or more heterogeneous phases or substances comprised in these phases and to a novel apparatus suitable for the practice of the new processes, particularly in a fuel cell.

Description of the prior art

Reactions between chemical reactants existing in the same or in different physical phases are well known. Broadly, the term phase relates to the fact that matter exists either as a solid, liquid or gas. The term phase as used throughout the description and claims of the invention is defined as any physical entity, or region, with a uniform set of properties. Thus, the invention is intended to include reactions between two or more liquids, or between gases and liquids, each of which may have its own set of physical properties and each of which therefore constitutes a separate phase.

Heterogeneous reactions between two fluids, which form separate phases when in contact with each other are well known in the art and numerous examples of this type of reaction can be found in the literature of the chemical arts. The fluids may be liquids which are mutually insoluble or only partially soluble, or a liquid and a gas, whereby the gas is insoluble or only partially soluble in the liquid, so that two separate phases are formed upon contact of the liquids or of the liquid or gas with each other with the formation of an interface between the fluids. The interaction between the phases may be a chemical or an electrochemical reaction, taking place between the liquids, or between the liquid and the gas. The reaction may also take place between one or more substances dissolved in one or both of the liquid phases or, if applicable, between a substance contained in the gas phase and a reactant dissolved in a liquid. The interaction between the phases may also be a physical transfer or exchange reaction of one or more components or substances dissolved in one of the liquid phases or contained in the gas phase.

The reaction rate in systems of this type is approximately proportional to the extent of the interphase between the two fluid phases, if no separate catalyst is required, or if the catalyst is dissolved in one or both phases. In order to achieve the highest possible reaction rate, it is therefore common practice, when two phases of separate liquids are used, to increase the interface between the two liquid phases by emulsifying or finely dispersing one liquid in the other. This step requires the expenditure of additional energy and often requires additional process steps for the separation of the dispersed phases after completion of the reaction.

If one of the reactants is a gas or is contained in a gaseous phase, the gas is usually introduced into and led through the liquid phase in the form of very fine bubbles, e.g., by dispersing it through a suitable diffuser distributor or nozzle. The interface between the gas and liquid may also be increased by flowing the liquid over the packing material or packing bodies in a packed column, where it is distributed, forming a large interface with the gas, which usually is led countercurrently through the packing of the column.

In the above described methods of the prior art if it is desired to homogeneously catalyze the reaction, the catalyst is usually dissolved in one of the liquid phases. In heterogeneously catalyzed reactions of this type, the catalyst may be deposited on the packing material or on the packing bodies of the packed column or it may be added in finely distributed or colloidal form to one of the phases.

It is an object of the present invention to provide a novel process for the heterogeneous interaction of two phases in which extremely fine distribution of the phases and an unusually large interface between the phases is readily achieved and in which no separate step is required for the separation of the reactant phases after completion of the reaction.

Another object is the provision of a novel device in which at least two separate fluid phases are brought into mutual contact in finely distributed form and with the formation of an exceptionally large interface between the phases for chemical and/or physical reaction between the fluids.

Other objects will become apparent from the attached drawings and from the following detailed description of the invention.

SUMMARY OF THE INVENTION

The objects of the invention are achieved by a process for the bringing about of interaction between at least two separate fluid phases, one of which fluid phases has a higher wetting ability, i.e., ability to wet the surface of pores of a porous body, than the other fluid phase, which process comprises the steps of separately introducing each fluid phase into the pores of a porous structure comprising an integrated network of intercommunicatively connected large and small pores; applying to the fluid phase having the lower wetting ability a hydrostatic pressure which is higher than the hydrostatic pressure applied to the fluid phase having the higher wetting ability thereby causing at least part of each of said smaller pores to be filled with or to contain fluid having the higher wetting ability and at least part of each of said larger pores to be filled with or to contain the fluid having the lower wetting ability, thus forming a large interface between the two fluid phases; and recovering separately the reacted fluid phases.

The two fluids forming the heterogeneous phases within the porous structure are advantageously continuously flowed through the structure, preferably countercurrently, by the application of a hydrostatic pressure differential between the inlets and outlets for each of the fluids. The fluids leaving the said porous structure may be readily separated by the provision of a porous cover layer having very fine pores for the recovery of the fluid having the higher wetting ability.

BRIEF DESCRIPTION OF THE DRAWING

In the attached drawings FIG. 1 is a vertical section, in schematic representation, of an embodiment of an apparatus in which the process of the present invention may be practiced.

FIG. 2 is a vertical section, in schematic representation, of another embodiment of apparatus of the invention in which a transfer fluid is circulated.

FIG. 2a is a vertical section, in schematic representation of another embodiment of the invention with provisions for two phases to be reacted therein.

FIG. 3 is a vertical section of apparatus of the invention, in schematic representation, for the carrying out of electrochemical reactions.

DESCRIPTION OF THE PREFERRED EMBODIMENTS

The process of the present invention permits the carrying out of chemical or electrochemical reactions, or transfer reactions, respectively, between fluid phases having different wetting ability and which are not completely mutually soluble, or between substances dissolved or carried in these fluid phases. According to the invention, the component having the lower wetting ability is subjected, as compared to the component having the higher wetting ability to an elevated hydrostatic pressure while both components are contained in the pores of a body having a multiplicity of pores of varying size. As a result of the pressure, a communicatively interconnected part of the smaller pores is substantially filled with the phase having the higher wettability. In this manner, the two phases are brought into intimate contact with each other within the pores of the porous body or structure for mutual reaction or interaction, respectively. Alternatively, the porous body may have multiplicity of uniformly sized pores, but of two different wetting properties. A differential wetting property or affinity for the phases can be imparted to the pores as by constructing the porous body of a mixture of metal and resinous material or making the porous body of or coating the interior of the pores with various hydrophobic resinous materials.

The novel apparatus of the present invention for the carrying out of heterogeneous chemical or physical transfer reactions or electrochemical reactions comprises a housing, at least one porous body in said housing, inlet means to said porous body through which a first fluid phase material can be supplied, outlet means for said first fluid phase material, inlet means to said porous body through which a second fluid phase material can be supplied, outlet means for said second fluid phase material, and means for applying a pressure differential between said fluid phases. The pores body comprises at least two different systems of different affinity for the phases used.

The housing may be made of any non-corrosive and non-reactive material capable of withstanding the pressure and temperatures to be encountered in the particular reaction to be carried out. In the case of electrochemical reactions, the housing preferably also should be non-conductive of electricity. Preferably, the housing is a thermosetting resinous material, e.g., an epoxy resin.

The inlet and outlet means for the first fluid phase material each preferably form one end of a pair of oppositely positioned endwalls for the housing. Preferably each of these means is porous. Each means is preferably made of metal, or carbonyl metal particles compressed to form a porous sheet or form. Each of said endwalls preferably serves as a retaining wall for holding the porous body in the housing. Each means essentially must be permeable by the first fluid phase material, which, for example, may be a gas. The inlet means is provided with fluid supply means through which the first fluid phase material is supplied from a source of supply. The outlet means is provided with a spent first fluid phase material draw-off means through which the spent, or reacted, fluid phase material or product formed therein, or therefrom, or a mixture thereof, is flowed to a storage or separator means.

The inlet and outlet means for the second fluid phase material each preferably are in the form of one of a pair of conduits each connected to and passing through an opening in a wall of the housing. Each of these means preferably is made of a material such as that used for the housing itself. Preferably, each is made of metal. These means can be connected to any wall of the housing through which the fluid phase material can be supplied to the porous body in the housing. These means can be connected to the side walls of the housing itself. Preferably, they are connected to the endwalls formed by the inlet and outlet means for the first fluid phase materials, as shown in FIGS. 1 and 2. This location is advantageous for countercurrent flow of the two fluid phases. A cross-flow advantage can be obtained by connecting the inlet and outlet means for the second fluid phase material between the endwalls formed by the inlet and outlet means of the first fluid phase, as shown in FIG. 3. The inlet means is provided with fluid supply means through which the second fluid phase material is supplied from a source of supply. The outlet means is provided with a spent second fluid phase material draw-off means connected to storage or separator means.

The porous body or structure comprises pores of varying size which are open and communicatively connected to each other. Normally, the body contains a wide range of pore sizes in random arrangement and typical of a particular porous catalyst or a porous catalytically inactive support for a catalyst. At least part of the pores should be in a size range in which capillary forces have an appreciable value. The two phases separate, with the formation of a stable interface, in the pores of the porous body or structure in all those cases where a differential in the capillary effect of the two phases exists when the two phases contact the porous body or structure.

The porous body is preferably made from a metal, so that the heat of reaction generated or consumed within the body, may be readily, respectively, taken out from or introduced into the body as the reaction proceeds. Effective heat exchange with the surroundings is further facilitated if the walls of the reaction vessel or housing, in which the porous body or structure is contained, is also made from a metal. The reaction vessel or housing may additionally be surrounded by or wrapped on its outside with suitable heating or cooling means, or it may be provided with fins, to achieve still better heat exchange. In this manner, it is also possible to produce in a long reaction vessel a temperature gradient in the direction of flow of one of the components, if this is desired for the achievement of better reaction conditions.

If this is desired to heterogeneously catalyze the reaction, the porous body or structure may be made from the catalyst material itself or it may contain the catalyst material imbedded in the material from which the body or structure is made. In this case, the reaction between the phases takes place in the areas where the three phases meet, i.e., at the three phase boundary between the catalyst, the phase having the higher wetting ability and the phase having the lower wetting ability.

The means for applying a pressure differential between the fluid phases may be of the known means for doing so, including, for example, a hydraulic head created by storage of the supply tank for a liquid phase material at a higher elevation than the reaction vessel, applying pressure to the second fluid phase material by a fan or compressor when the material is a gas or by a pump when it is a liquid, or by reducing the pressure of the first fluid phase material by similar means, including vacuum pump means when advantageous.

The novel concept of the invention is advantageous for performing a variety of different reactions. For example, the reaction may be a chemical or electrochemical reaction between two liquids; or between a liquid and a gas; or between a liquid or a gas and one or more substances dissolved or contained in a liquid; or between one or more substances separately dissolved in two liquids. The reaction may also be a physical exchange or transfer reaction, wherein one or more substances are physically transferred from one liquid to another or from a gas to a liquid or from a liquid to a gas. It is important, however, that different fluid phase materials contacted in the process of the invention, do not completely dissolve together and that the fluids have a different wetting ability. The terms higher wetting ability and lower wetting ability are to be undersood to be relative. It is not the absolue value of the wetting ability but the differential in the wetting abilities of the phases with respect to the pore surfaces which is important for the operativeness of the process of the invention resulting in a differential of the capillary forces as set out hereinafter.

The principle underlying the process of the present invention can be demonstrated most readily on the basis of an example involving two liquid materials representing two different liquid phases in which one liquid material readily wets the surface of the porous body and the other liquid material does not readily wet this surface. If the porous body is first contacted with the readily wetting liquid, the liquid penetrates into or is soaked up in the pores of the body under the effect of the capillary forces, substantially completely filling the pores.

If the body thus filled with the more readily wetting liquid is thereafter contacted with the other liquid which has the lower wetting ability the latter can penetrate into the pores only if it is placed and maintained under a hydrostatic pressure which is greater than that of the first liquid and which is high enough to overcome the capillary forces between the surface of the porous body and the readily wetting liquid to physically displace the latter liquid. Since the capillary force is dependent on the pore size, an increase of the hydrostatic pressure results in an increase of the number of pores of varying pore sizes which are filled in porous body with the liquid which does not readily wet the surface of the porous body.

If $\Delta p$ designates the hydrostatic pressure differential between the two liquids, $\sigma$ the interfacial tension between the two liquids, $\theta$ the contact angle at the surface of the solid porous body and $r$ the radius of the pores, only those pores of the porous body are filled by the liquid which does not readily wet the porous body, which satisfy the following relationship:

$$r = \frac{2\sigma}{\Delta p} \times \cos \theta$$

Under these conditions, the porous body contains two systems of mutually interspersed and communicatively connected pores; the system of the smaller pores, i.e., those having a higher capillary pressure, is filled with the readily wetting liquid, and the system of the larger pores, i.e., those having a lower capillary pressure, is filled with the liquid having the lower wetting ability. Thus, the penetration of the liquid having the lower wetting ability readily can be controlled by adjusting the differential between the hydrostatic pressures of the two liquids in accordance with the above relationship in relation to the absolute and relative pore sizes of a wettability of the porous body.

Each liquid readily may be flowed independently through its own system of pores by the effect produced by a small increase of the pressure at the inlet means of each of the fluids, resulting in a pressure differential between the inlet and outlet means independently for each of the fluid phases. In this manner, the two phases have within the porous body a very extensive common interface common at the boundary of the phases in the pores. This boundary is dynamic in that it is continuously renewed by the flow of the phases.

The foregoing considerations apply in similar manner to liquids which contain one or more substances dissolved therein and to systems where one of the phases is the gaseous state.

Referring to FIG. 1, an embodiment of the apparatus in which the process of the invention may be practiced, comprises a cylindrical wall 1 of the housing or reaction vessel, in which is enclosed porous body 2. The circular ends of the body 2 are covered by the pair of porous cover layers 3 and 3a, each having a finer pore size than that of body 2. Tubes 4 and 5 centrally penetrate cover layers 3 and 3a, and are in communicative contact with porous body 2. The fluid phase material having the lower wetting ability 9 is introduced into porous body 2 through tube 4 and is recovered through tube 5. Cover layer 3 forms one end of a chamber 6 for the introduction of the component or phase having the higher wetting ability 8 and passing through the fine pores of cover layer 3 into porous body 2. Cover layer 3a similarly forms one end of a chamber 7 for the recovery of the product formed in porous body 2 along with spent and unreacted fluid phase reactant material.

For the operation of the apparatus, the fluid phase material having the higher wetting ability 8 is introduced into chamber 6 under a slightly higher pressure than prevails inc hamber 7. The pressure gradient established in this manner causes the readily wetting fluid to flow through the pores of cover layers 3 and 3a and through the pores of body 2 as indicated by the upwardly pointing arrows. The fluid component having the lower wetting ability 9 is introduced through tube 4 at a pressure slightly higher than that prevailing at tube 5, to establish a pressure gradient between tubes 4 and 5. The higher pressure at tube 4 causes the fluid having the lower wetting ability 9 to flow counter-currently to the fluid having the higher wetting ability 8 through the pores of body 2 in the direction indicated by the downwardly pointing arrows. The fluid 9 having the lower wetting ability is held thereby under an overall pressure which is higher by the pressure differential $\Delta p$ than the overall pressure under which the fluid 8 having the higher wetting ability is flowed through the device. $\Delta p$ is adjusted so that the fluid having the lower wetting ability 9 fills a sufficiently large part of the large pores to produce the desired extensive interface between the two fluids in the pores of body 2, where the desired transfer chemical or electrochemical reaction takes place between reactants of the two fluid phase materials.

If desired, the two fluids 8, 9 may also be flowed co-currently through the body 2.

The extremely fine pore size in body 2 results in an extremely fine distribution of the two phases in the pores with a correspondingly large common interface.

If the reaction is homogeneously catalyzed by a catalyst which is dissolved in one of the components, e.g., 8, the reaction is effected over the total interface between the finely distributed phases 10, independently of whether the fluids 8, 9 forming the phases do directly react with each other or whether the reaction takes place between substances dissolved in one or two liquid phases or in a gas phase.

The process and apparatus of the invention are equally useful for the effecting of exchange or transfer reactions in the course of which at least one dissolved or chemically bound component is transferred under the effect of a chemical concentration gradient, or of a chemical potential gradient, from one phase to the other.

A composite apparatus of the invention for the transfer of a component, dissolved or otherwise contained in one phase, by help of a transfer fluid, to another phase is illustrated in FIG. 2. The apparatus comprises two interconnected reaction vessels, reactor A and reactor B of the kind described in FIG. 1, comprising porous bodies 2 and 2a, respectively, covered at the ends thereof by finely porous cover layers 3 and 3a, respectively, and enclosed in a pair of cylindrical housings 1a and 1b, respectively. At the bottoms and tops of the two housings are provided chambers 6a and 6b, and 7a and 7b, respectively. Chamber 7a of the housing 1a is communicatively connected to chamber 7b of housing 1b by conduit pipe 12. Chamber 6a is communicatively connected to chamber 6b by conduit pipe 14. An electrically driven pump 11 circulates a fluid phase material 8a in a closed cycle through pipe line 13 into chamber 6b of reactor A, through chamber 6b, through porous cover layer 3, through porous body 2a, through cover layer 3a, through chamber 7b, through pipe line 12 out of reactor A and into reactor B, through chamber 7a, through porous cover layer 3, through porous body 2, through chamber 6a, and through a pipe line 14 from reactor B back to the intake of the pump 11. A side pipe line 19 with shutoff valve is provided on pipe line 14 for charging fluid 8a to the system and for replenishing the fluid as needed to make up losses from the system.

In reactor A, fluid inlet conduit pipe 4a is connected through endwalls 15 of housing 1b and through porous cover layer 3a into contact with porous body 2a. Also, in reactor A, fluid outlet conduit pipe 5a is connected through endwall 16 of housing 1b and porous cover layer 3 into contact with porous body 2a.

In reactor B, fluid inlet conduit pipe 4 is connected through endwall 17 of housing 1a and porous cover layer 3a into contact with porous body 2, and fluid outlet conduit pipe 5 is connected through endwall 18 of housing 1a and porous cover layer 3 into contact with porous layer 2. Fluid phase materials 9a and 9b, each having a lower wetting ability than the liquid 8a, are flowed, respectively, through reactor A through conduit pipe 4a, and through reactor B through conduit pipe 4.

By way of further illustration of the process of the invention, a liquid fluid phase material 8a comprises a liquid, e.g., water, which serves as a solvent for an absorbent-reactant solute, e.g., diethanolamine. The liquid 8a serves as an absorbent-reactant composition for a material in fluid phase material 9a, e.g., $CO_2$. The liquid 8a is circulated by means of pump 11 through tube 13 into chamber 6b of the reactor A, where it flows through the pores of cover layer 3 upwardly through the pores of porous body 2a and through finely porous cover layer 3a at the top of the reactor chamber 7b, which it leaves through pipe line 12. It then enters upper chamber 7a in reactor B, from where it flows down through cover layer 3 through the pores of porous body 2 and through the fine pores of cover layer 3a into chamber 6a, from where it is returned through pipe line 14 to pump 11.

Fluid phase material 9a, e.g., a gaseous mixture of $CO_2$ and $H_2$, in which $CO_2$ is the component to be transferred, and which has a lower wetting ability than the circulated transfer fluid 8a, is introduced through conduit pipe 4 under an elevated pressure exceeding the pressure of circulated fluid 8a by a pressure differential $\Delta p_1$, and passed into and through the pores of porous body 2 countercurrently to liquid 8a. The gases and the liquid form separate, finely distributed phases in body 2 and the component to be transferred, e.g., $CO_2$, is taken up, i.e., absorbed, through the interface, by liquid 8a. The liquid phase material 8a, rich in the transferred component, is then forwarded by pump 11 into the porous body 2a of reactor A. The remainder of fluid 9a, i.e., $H_2$ freed of $CO_2$ by the countercurrently flowing fluid 8a, passes into outlet conduit pipe 5 of reactor B and is used therefrom or is moved to storage means (not shown).

Another fluid phase material 9b, which may be another gas, or a liquid, is flowed into reactor A through conduit pipe 4. Preferably, it is a fluid material which is not fully miscible with nor soluble in transfer fluid 8a, and which forms in body 2a a finely distributed separate phase. Fluid 9b is held at an elevated pressure differential $\Delta p_2$ relative to liquid 8a. Fluid 9b, e.g., air, takes up the transferred component, e.g., $CO_2$, from the circulated liquid 8a under the suitably adjusted pressure and/or temperature conditions. Fluid material 9b, enriched with the transferred component, e.g., $CO_2$, leaves the apparatus through conduit pipe 5a and transfer fluid 8a, low in transferred component, is returned to reactor B for a new absorption-desorption transfer cycle.

The apparatus, as illustrated in FIG. 2, permits the advantageous transfer of a component A which is dissolved or otherwise contained in phase 9a to a phase 9b by the use of a transfer liquid 8a which readily wets the material of which porous bodies 2 and 2a are made. It is also advantageous to use as the circulated transfer fluid 8a a fluid which has a low wetting ability for the transfer of a substance from a phase which has a low wetting ability to another phase having a higher wetting ability.

It is further advantageous to operate the apparatus of FIG. 2 so that the circulated phase 8a wets one of the porous bodies relatively well in a first reactor in comparison with the phase flowed countercurrently thereto in said reactor, while it wets the other porous body relatively poorly in comparison with the phase which is flowed countercurrently thereto in a second reactor.

The latter embodiment is illustrated in FIG. 2a wherein pipe line 13 is directly connected through housing 1c of reactor C to conduit pipe 5d which passes through porous cover layer 3a and is in contact with porous body 2b, and wherein the upper part of porous body 2b is in contact with conduit pipe 4c which passes through porous cover layer 3 and is connected to pipe line 12 which passes through housing 1c. Reactor C is also provided with fluid inlet conduit pipe 20 which passes through the upper endwall of housing 1c and fluid outlet conduit pipe 21 which passes through the lower endwall of housing 1c. In carrying out the process of the embodiment, fluid phase material 8a, a phase having a poor wetting ability, is circulated through reactor C, entering through pipe line 13, passing through the porous body 2b and leaving through pipe line 12. Fluid phase material 9c, having a good wetting ability, is flowed through an inlet conduit pipe 20 into chamber 7c where it passes through the pores of porous cover layer 3, through the pores of porous body 2b and through porous cover layer 3a at the bottom into chamber 6c, which it leaves through outlet conduit pipe 21. The interaction between the two phases is controlled in the desired manner by a suitable choice of the relative hydrostatic pressures and the pressure differential $\Delta p_2$ in the manner already described.

In a further embodiment of the invention, the process also may be operated advantageously as an electrochemical reaction for the generation of electrical energy and utilization thereof. Such an embodiment of this invention is generally carried out in such manner that electrolyte having a high wetting ability flows through or is contained in the fine pores of a porous electrochemical material body, and a phase having a relatively lower wetting ability flows through the larger pores of a porous body. The body is then electrically connected and serves as an electrode. Suitable catalytic material is deposited within the pores of the porous body in a known manner, or the porous body can be made of catalytic material.

FIG. 3 illustrates a fragmentary vertical section of apparatus for carrying out of an electrochemical reaction. The apparatus comprises a reaction vessel having a housing with walls 22, in which is provided a porous, metallic reaction body 2, separating the reaction vessel into chambers 6 and 7. The sides of body 2, facing chambers 6 and 7 are covered by finely porous cover layers 3 and 3a. Inlet conduit pipe 4 and outlet conduit pipe 5 penetrate the walls 22 and contact the pore system of porous reaction body 2b. A suitable electrode and a counter electrode, such as those used in a fuel cell, are provided in chambers 6 and 7 (but not shown). Electrical conductor 23 is conductively connected to porous body 2 which serves as a reaction body for the supply of electrons as reaction partner or for the removal of electrons from body 2, as the case may be.

For the operation of the apparatus, a phase or component having a lower wetting ability 9d is introduced at conduit pipe 4, flowed through the porous body 2, and recovered through the opposite conduit pipe 5. Chambers 6 and 7 are substantially filled with electrolyte 8b, which fills also part of the pores of the porous reaction body 2. The ions of the electrolyte 8b are transported, under the effect of the electrical field established between the opposite electrodes contained in chambers 6 and 7, through the pores of the porous body 2. If the reactants and reaction products are diffusing at a sufficiently high rate, it is not necessary that the electrolyte 8b flow during reaction within or through the electrolyte filled pores of porous reaction body 2. Electrons are supplied to or removed from the reactants over the metallic structure of porous reaction body 2 during the reaction, as needed, over electrical conductor 23.

The invention is further illustrated by the following nonlimiting examples.

EXAMPLE 1

Carbon dioxide was continuously removed from a streaming gaseous mixture containing about 75% by volume hydrogen gas and about 25% by volume carbon dioxide gas in an apparatus corresponding to that illustrated in FIG. 2.

The cylindrical porous bodies 2 and 2a were made from nickel and had a diameter of 40 mm. and a height of 30 mm. They were produced by compressing a mixture of carbonyl nickel particles with potassium chloride powder at a temperature of 350° C. and at a pressure of 1 t./cm.$^2$. The potassium chloride was thereafter removed by leaching with water. To the circular end faces of the cylinders were joined cover layers obtained by the compression of carbonyl nickel particles alone, and without the addition of potassium chloride.

The cover layers were 0.5 mm. thick. Tubes made from nickel metal and having a diameter of 3 mm. were provided through a central opening in each cover layer so that the tubes were in contact with and reached into the cylindrical porous reaction bodies 2 and 2a. The cylindrical bodies 2 and 2a were housed by pressing a plexigum housing around them, which enclosed the porous bodies substantially in the manner illustrated in FIG. 2. The units were installed into an apparatus as reactors A and B as shown in FIG. 2.

As the absorption and transfer medium, having a high wetting ability 8a of FIG. 2, there was used an 8 N aqueous solution of diethanolamine which was circulated by means of pump 11 through the apparatus at about normal atmospheric pressure at ambient room temperature. The gaseous mixture of hydrogen and carbon dioxide (9a of FIG. 2) was passed countercurrently to the diethanolamine solution through the pores of porous body 2a at a pressure of one atmosphere gauge. Porous body 2a was thereby maintained at about 25° C. Substantially all of the carbon dioxide in the feed mixture was taken up by the diethanolamine solution. The hydrogen was recovered from the purification process at the hydrogen outlet tube (5a of FIG. 2) of the apparatus.

The diethanolamine solution, enriched with the carbon dioxide extracted from the gaseous hydrogen-carbon dioxide mixture, was circulated to the unit shown as reactor B of FIG. 2, and through the pores of porous body 2. A stream of air (9b of FIG. 2) was passed countercurrently to the streaming diethanolamine solution through porous body 2 at a pressure of 0.2 atmosphere gauge. Porous body 2 was thereby maintained at a temperature of 75° C. The carbon dioxide contained in the diethanolamine solution was thereby transferred to and taken up by the streaming air and the diethanolamine was pumped to porous body 2a for a new absorption-desorption cycle.

EXAMPLE 2

The chemical reaction was carried out in an apparatus corresponding to the device illustrated in FIG. 1 of the attached drawing. The porous body (2 of FIG. 1) was prepared in the manner described in Example 1.

A 5 N aqueous solution of potassium hydroxide was flowed at about atmospheric pressure through chamber 6 and the adjoining cover layer 3 and through porous body 2. A gaseous mixture of 25% by volume of carbon monoxide and 75% by volume of nitrogen was introduced at an inlet tube (4 of FIG. 1) and flowed countercurrently to the potassium hydroxide solution through the pores of porous body 2, at a pressure of 1.7 atmosphere gauge. Porous body 2 was maintained at 90° C. The potassium formate formed thereby was dissolved in the potassium hydroxide solution and flowed from the porous body 2 through the porous layer 3a into chamber 7 and was recovered therefrom by conventional separation methods.

EXAMPLE 3

Using an apparatus constructed according to FIG. 1 of the attached drawings and containing a porous body 2 produced in accordance with that described in Example 1, bromine was transferred from an aqueous solution into chloroform.

An aqueous solution saturated with bromine was flowed, as the phase having a high wetting ability, through chamber 6, porous cover layer 3 and porous body 2 and cover layer 3a, at approximately atmospheric pressure. Chloroform was introduced at tube 4 and flowed countercurrently to the aqueous bromine solution through body 2 at a pressure of 0.5 atmosphere gauge. Porous body 2 was thereby maintained at approximately room temperature. The bromine was transferred into and taken up by the chloroform. The chloroform solution so formed was reversed in chamber 7. Substantially bromine-free water was removed through tube 5.

The process of the invention is useful in many types of operations where two or more nonsolid phases are to be contacted. The operation may be an absorption-desorption type, such as described in Example 2, for transferring one component from one phase to another phase to which it is attracted on the basis of selective physical and chemical properties of the materials involved. The solute in a solvent type phase can be any gas, solid or liquid which is soluble in the solvent or can be carried thereby and which does not cause a precipitant to form that block the pores of the porous body.

In the electrochemical operation of the process, the electrolyte may be the phase having the better wettability of the two phases, it may carry or have at least partially dissolved therein, a suitable oxidant for the fuel and the other phase to be electrochemically reacted with oxidant is the fuel. Conversely the electrolyte can transport as by having at least partially dissolved therein a suitable fuel and the oxidant is then provided as the other phase. The prorous bodies comprise catalytic materials and may be arranged in an arrangement of electrode and counterelectrode.

Electrodes for such an arrangement can be made of known catalytic and noncatalytic materials. Suitable electrolytes both acidic and basic are likewise known. Suitable fuels include, for instance, carbon-containing liquids, or gaseous fuels like hydrogen, gaseous hydrocarbons or oxygen-containing hydrocarbons, carbon monoxide, alkanols, like methanols, ketones, aldehydes like formaldehyde, and carboxylic acids like formic acid. Typical oxidants include oxygen, air, chlorine and others. For further details, the following prior art is incorporated herein by reference: Fuel Cell Systems, A. C. S. Series 47, American Chemical Society (1965); Fuel Cells Editor Young, volumes 1 and 2, 1963, Reinhold Publishing Corporation; Brennstoffelemente, Wolf Vielstich, Verlag Chemic, 1965; Fuel Cells, Justi and Winsel Franz Steiner Verlag, 1962, U.S. Pats. 3,082,282; 3,116,169; 2,912,478; 2,925,454; 2,946,836; 2,947,717; 3,121,031; and Status Report on Fuel Cells, PB151,804, 1959.

When the process of the invention is used to transfer a dissolved component from one pulse into another phase, for example when carbon dioxide is transferred from a bicarbonate solution into a gas stream or from a gas stream into bicarbonate solution, several reaction vessels are used in which the phases are flowed counter-currently in a cascaded fashion. A gaseous mixture containing carbon dioxide is substantially freed from the carbon dioxide by the process of the invention using an assembly where several devices, as shown in FIG. 1, are connected in series and where the washing solution flows through said devices successively. The gas flows through the reaction vessels counter-currently to the washing solution, so that it enters into the reaction vessel where the washing solution has the highest concentration of carbon dioxide. Before the gas leaves the assembly of reaction vessels even traces of carbon dioxide have been transferred to the washing solution in the last reaction vessel, since here that solution has the lowest concentration and therefore the lowest pressure of the carbon dioxide.

This assembly of cascade reaction vessels is especially suitable if the process of the invention is used in systems, where a reaction or an exchange process between solutions with different wetting properties or between component contained in these solutions proceeds to the state of equilibrium of the reaction.

When the process of the invention is applied to systems in which chemical or electrochemical reactions occur, one must take care that no solid reaction products are formed, since otherwise the fine porous zones are soon clogged.

The process of the invention is particularly useful for the reaction between substances which normally form aerosols. For example, sulfurous acid is produced without the formation of an acid mist by supplying water as the first phase and sulfur dioxide as a second phase to the reaction vessel of the invention. In a following step, it is possible to transform the aqueous sulfurous acid into sulfuric acid by supplying air as the second phase.

In a similar manner, as aqueous solution of hydrochloric acid is produced from hydrochloric gas and water, using the process and the apparatus of the invention.

Furthermore, the concentration of diluted salt solutions is increased, using hot air as the second phase in the process of the invention.

The process and apparatus of the invention is also highly advantageous carrying out the processes of chlorination and nitration. Whereas several hours are required in the nitration of benzene to obtain nitrobenzene at a temperature of 50° centigrade, the time used is greatly decreased when the nitration is carried out according to the process of the invention using 1.6 kg. of benzene as one phase and a mixture of 1.9 kg. of 75% by weight nitric acid and 2.7 kg. of 95% by weight sulfuric acid.

I claim:

1. A purification process for separating carbon dioxide from a gaseous mixture which comprises separately introducing an aqueous alkaline phase and a gas phase comprising a mixture of carbon dioxide and hydrogen, the two gases having a different wettability and not being soluble within each other, the first phase having a higher wettability than the second phase, into a solid porous body having two systems of intercommunicating pores, each system having a different capillary pressure with respect to the other, flowing the two phases in contact with each other within said body, the phase having the lower wettability being under a higher hydrostatic pressure within the pores having the lower capillary pressure and the phase having the higher wettability being under a lower hydrostatic pressure within the pores having the higher capillary pressure, transferring the carbon dioxide while the two phases are in contact with each other from the hydrogen to the aqueous phase and withdrawing separately from the hydrogen the carbon dioxide enriched aqueous phase from the porous body in which it was flowing.

2. The process of claim 1 wherein the two phases are flowing essentially continuously.

3. The process of claim 1 wherein the two phases are flowing counter-currently.

4. The process of claim 1 wherein the aqueous phase comprises a lower alkanolamine.

5. The process of claim 4 wherein the amine is an ethanolamine.

6. The process of claim 5 wherein the carbon dioxide which separated from the hydrogen is taken up by the ethanolamine.

7. The process of claim 4 wherein the pressure differential between the two phases is about one atmosphere gauge.

8. The process of claim 5 wherein the carbon dioxide enriched ethanolamine is passed counter-currently to a stream of air, thereby removing the carbon dioxide from the ethanolamine.

9. The process of claim 1 wherein the carbon dioxide enriched aqueous phase is recirculated to the porous body.

References Cited

UNITED STATES PATENTS

| | | | |
|---|---|---|---|
| Re. 18,958 | 9/1933 | Bottoms | 23—2 |
| 2,487,360 | 11/1949 | Newton | 23—2 X |
| 2,662,001 | 12/1953 | Burns et al. | 23—267 |
| 2,721,790 | 10/1955 | Olney | 23—310 |
| 2,819,887 | 1/1958 | Eversole et al. | 261—94 |
| 3,351,434 | 11/1967 | Grimes et al. | 23—310 |
| 3,082,282 | 3/1963 | Gruenberg et al. | 136—86 |
| 3,083,251 | 3/1963 | Moos | 136—86 |
| 3,201,282 | 8/1965 | Justi et al. | 136—86 |
| 3,280,014 | 10/1966 | Kordesch et al. | 136—86 X |
| 3,125,468 | 3/1964 | Thompson et al. | 136—86 |

FOREIGN PATENTS

| | | | |
|---|---|---|---|
| 698,702 | 11/1964 | Canada | 23—310 |

EARL C. THOMAS, Primary Examiner

U.S. Cl. X.R.

23—1 R, 204 M, 217, 267, 310; 55—68; 136—86 R, 86 E; 210—21; 260—542; 261—94